United States Patent
You et al.

(10) Patent No.: US 12,126,563 B2
(45) Date of Patent: Oct. 22, 2024

(54) METHOD FOR ACTIVATING OR UPDATING PATH LOSS RS OF SRS AND DEVICE

(71) Applicant: GUANGDONG OPPO MOBILE TELECOMMUNICATIONS CORP., LTD., Dongguan (CN)

(72) Inventors: Xin You, Dongguan (CN); Zhihua Shi, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 323 days.

(21) Appl. No.: 17/692,554

(22) Filed: Mar. 11, 2022

(65) Prior Publication Data

US 2022/0200764 A1    Jun. 23, 2022

Related U.S. Application Data

(63) Continuation of application No. PCT/CN2019/116077, filed on Nov. 6, 2019.

(51) Int. Cl.
*H04L 5/00*    (2006.01)
*H04W 28/02*   (2009.01)

(52) U.S. Cl.
CPC ....... *H04L 5/0053* (2013.01); *H04W 28/0236* (2013.01)

(58) Field of Classification Search
None
See application file for complete search history.

(56) References Cited

U.S. PATENT DOCUMENTS

| | | |
|---|---|---|
| 2019/0174466 A1 | 6/2019 | Zhang et al. |
| 2019/0281588 A1 | 9/2019 | Zhang et al. |
| 2019/0312698 A1 | 10/2019 | Akkarakaran et al. |
| 2022/0225242 A1* | 7/2022 | Guan .................. H04W 52/146 |
| 2022/0330293 A1* | 10/2022 | Matsumura ........... H04W 72/23 |

FOREIGN PATENT DOCUMENTS

WO    2020255401 A1    12/2020

OTHER PUBLICATIONS

Extended European Search Report issued in corresponding European application No. 19952030.5, mailed Aug. 1, 2022.
(Continued)

*Primary Examiner* — Anh Ngoc M Nguyen
(74) *Attorney, Agent, or Firm* — BAYES PLLC

(57) ABSTRACT

Embodiments of the present application relate to a method for activating or updating a pathloss reference signal corresponding to a sounding reference signa and a device. The method includes: receiving, by a terminal device, a MAC CE sent by a network device, the MAC CE including at least one SRS resource set field and/or at least one pathloss RS field, the at least one SRS resource set field being used to indicate at least one SRS resource set, and the at least one pathloss RS field being used to indicate at least one pathloss RS corresponding to the at least one SRS resource set; and updating or activating, by the terminal device, the at least one pathloss RS corresponding to the at least one SRS resource set according to the MAC CE.

11 Claims, 8 Drawing Sheets

(56) References Cited

OTHER PUBLICATIONS

Ericsson, "Signalling reduction for beam-based UL power control", Tdoc R1-1907475, 3GPP TSG-RAN WG1 Meeting #97 Reno, USA, May 13-May 17, 2019.
LG Electronics, "Feature lead summary#3 of Enhancements on Multi-beam Operations", R1-1911485, 3GPP TSG RAN WG1 Meeting #98bis Chongqing, China, Oct. 14-20, 2019.
First Office Action issued in corresponding Japanese application No. 2022-525917, mailed Sep. 19, 2023.
3GPP TSG-RAN WG2 Meeting #101 Athens, Greece, Feb. 26-Mar. 2, 2018; R2-1802418 Source: Samsung; Title: New MAC CEs for NR MIMO.
3GPP TS 38.331 V15.7.0 (Sep. 2019); 3rd Generation Partnership Project; Technical Specification Group Radio Access Network; NR; Radio Resource Control (RRC) protocol specification(Release 15).
3GPP TSG RAN WG1 Meeting #98bis Chongqing, China, Oct. 14-20, 2019; R1-1911593 Source: LG Electronics; Title: Feature lead summary#5 of Enhancements on Multi-beam Operations.
3GPP TSG RAN WG1 #98bis Chongqing, China, Oct. 14-20, 2019; R1-1910117 Source: OPPO; Title: Discussion on Multi-beam Operation Enhancements.
3GPP TSG RAN WG1 #98bis Chongqing, China, Oct. 14-20, 2019; R1-1911236 Source: China Telecom; Title: Enhancements on multi-beam operation.
International Search Report issued in corresponding International Application No. PCT/CN2019/116077, mailed Jul. 29, 2020, 29 pages.
Written Opinion of the International Searching Authority issued in corresponding International Application No. PCT/CN2019/116077, mailed Jul. 29, 2020, 9 pages.

\* cited by examiner

| R | serving cell ID | | | | BWP ID | | | Oct 1 |
|---|---|---|---|---|---|---|---|---|
| R | R | R | R | SRS resource set ID | | | | Oct 2 |
| $S_7$ | $S_6$ | $S_5$ | $S_4$ | $S_3$ | $S_2$ | $S_1$ | $S_0$ | Oct 3 |

...

| R | R | R | R | SRS resource set ID | | | | Oct N-1 |
|---|---|---|---|---|---|---|---|---|
| $S_7$ | $S_6$ | $S_5$ | $S_4$ | $S_3$ | $S_2$ | $S_1$ | $S_0$ | Oct N |

FIG. 12

| R | serving cell ID | BWP ID | Oct 1 |
|---|---|---|---|
| pathloss RS ID | | pathloss RS ID | Oct 2 |
| pathloss RS ID | | pathloss RS ID | Oct 3 |

...

| pathloss RS ID | pathloss RS ID | Oct N |
|---|---|---|

FIG. 13

| R | serving cell ID | BWP ID | Oct 1 |
| SRS resource set ID | | SRS resource set ID | Oct 2 |
| SRS resource set ID | | SRS resource set ID | Oct 3 |
| ... | | | |
| SRS resource set ID | | SRS resource set ID | Oct N |
FIG. 14
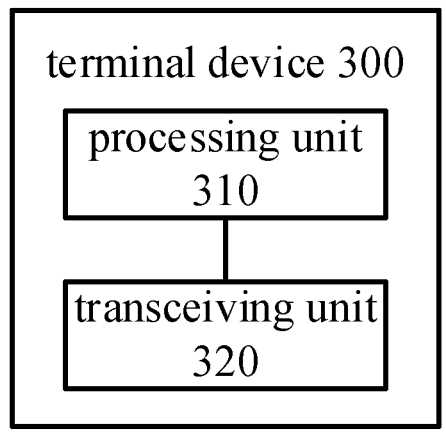
FIG. 15
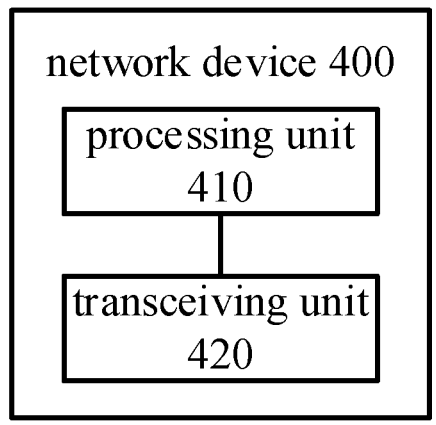
FIG. 16

METHOD FOR ACTIVATING OR UPDATING PATH LOSS RS OF SRS AND DEVICE

CROSS-REFERENCE TO RELATED APPLICATION

This application is a continuation of International Application No. PCT/CN2019/116077, filed Nov. 6, 2019, entitled "METHOD FOR ACTIVATING OR UPDATING PATH LOSS RS OF SRS AND DEVICE", the contents of which are incorporated herein by reference in its entirety.

TECHNICAL FIELD

Embodiments of the present disclosure generally relate to the communication technical field, and more particularly, to methods and devices for activating or updating a pathloss RS of an SRS.

BACKGROUND

A network device may configure multiple pathloss Reference Signals (RSs) for a terminal device through a Radio Resource Control (RRC) message. At the same time, the network device can also indicate identifiers (IDs) of pathloss RSs in one or more Sounding Reference Signal (SRS) resource sets through the RRC message to activate or update the pathloss RSs in the SRS resource sets.

However, the transmission delay by using the RRC message is relatively large, and thus how to activate or update the pathloss RSs in the SRS resource sets more quickly is a problem that needs to be solved urgently.

SUMMARY

Embodiments of the present disclosure provide a method and device for activating or updating a pathloss RS of a SRS, which can reduce transmission delay.

According to a first aspect, there is provided a method for activating or updating a pathloss reference signal corresponding to a sounding reference signal, the method including:

receiving, by a terminal device, a Medium Access Control (MAC) Control Element (CE) sent by a network device, wherein the MAC CE include at one Sounding Reference Signal (SRS) resource set field and/or at least one pathloss Reference Signal (RS) field, the at least one SRS resource set field is used to indicate at least one SRS resource set, and the at least one pathloss RS field is used to indicate at least one pathloss RS corresponding to the at least one SRS resource set; and updating or activating, by the terminal device, the at least one pathloss RS corresponding to the at least one SRS resource set according to the MAC CE.

According to second aspect, there is provided a method for activating or updating a pathloss reference signal corresponding to a sounding reference signal, the method including:

sending, by a network device, a Medium Access Control (MAC) Control Element (CE) to a terminal device, wherein the MAC CE includes at least one Sounding Reference Signal (SRS) resource set field and/or at least one pathloss Reference Signal (RS) field, the at least one SRS resource set field is used to indicate at least one SRS resource set, the at least one pathloss RS field is used to indicate at least one pathloss RS corresponding to the at least one SRS resource set, and the MAC CE is used to indicate the terminal device to update or activate the at least one pathloss RS corresponding to the at least one SRS resource set.

According to a third aspect, there is provided a terminal device configured to perform the method according to the first aspect or any implementation of the first aspect. Specifically, the terminal device includes functional modules configured to perform the method according to the first aspect or any implementation of the first aspect.

According to a fourth aspect, there is provided a network device configured to perform the method according to the second aspect or any implementation of the second aspect. Specifically, the network device includes functional modules configured to perform the method according to the second aspect or any implementation of the second aspect According to a fifth aspect, there is provided a terminal device including a processor and a memory configured to store a computer program, wherein the processor is used to call and run the computer program stored in the memory to perform the method according to the first aspect or any implementation of the first aspect.

According to a sixth aspect, there is provided a network device including a processor and a memory configured to store a computer program, wherein the processor is used to call and run the computer program stored in the memory to perform the method according to the second aspect or any implementation of the second aspect.

According to a seventh aspect, there is provided a chip configured to perform the method according to the first or second aspect or any implementation of the first or second aspect. Specifically, the chip includes a processor configured to call and run a computer program stored in a memory to cause a device in which the chip is installed to perform the method according to the first or second aspect or any implementation of the first or second aspect.

According to an eighth aspect, there is provided a computer-readable storage medium configured to store a computer program, wherein the computer program is configured to cause a computer to perform the method according to the first or second aspect or any implementation of the first or second aspect.

According to a ninth aspect, there is provided a computer program product including computer program instructions that cause a computer to perform the method according to the first or second aspect or any implementation of the first or second aspect.

According to a tenth aspect, there is provided a computer program. When the computer program runs on a computer, the computer is caused to perform the method according to the first or second aspect or any implementation of the first or second aspect.

Using the above technical solutions, the pathloss RS ID of the SRS resource set is activated or updated based on the MAC CE, and thus the transmission delay is greatly reduced.

BRIEF DESCRIPTION OF THE DRAWINGS

FIG. 12 is a schematic diagram of another MAC CE format according to an embodiment of the present disclosure.

FIG. 13 is a schematic diagram of another MAC CE format according to an embodiment of the present disclosure.

FIG. 14 is a schematic diagram of another MAC CE format according to an embodiment of the present disclosure.

FIG. 15 is a schematic block diagram of a terminal device according to an embodiment of the present disclosure.

FIG. 16 is a schematic block diagram of a network device according to an embodiment of the present disclosure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, and so on.

Figure 1:
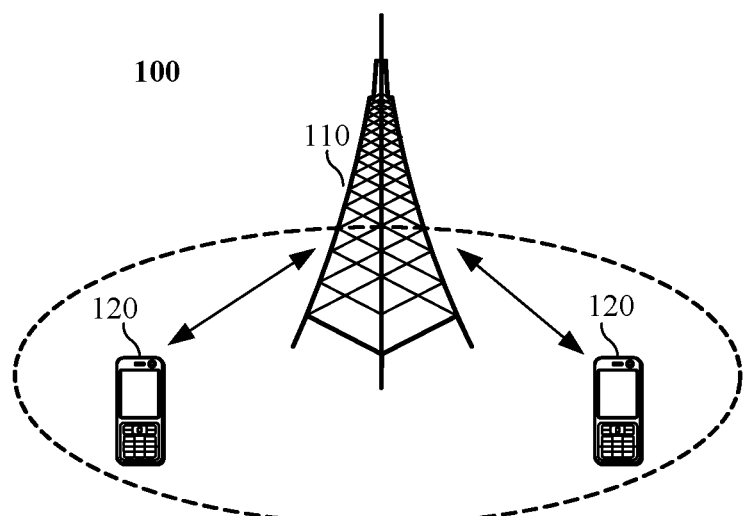
FIG. 1 is a schematic diagram of a communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area.

According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 further includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to some embodiments, a Device to Device (D2D) communication may be performed between the terminal devices 120.

According to some embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 1 as an example, the communication device may include the network device 110 and the terminal devices 120 having a communication function. The network device 110 and the terminal devices 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

It should be understood that the terms "system" and "network" are often used interchangeably herein. The term "and/or" herein is only an association relationship describing associated objects, which means that there can be three kinds of relationships, for example, A and/or B can mean: A alone, B alone, and A and B together.

In addition, the character "/" generally indicates that the associated objects before and after "/" are in an "or" relationship.

Considering the large time delay resulted by using the RRC message to indicate activation or updating of the pathloss RS in the SRS resource set, embodiments of the present disclosure provide a method for activating or updating the pathloss reference signal corresponding to the sounding reference signal, in which a Medium Access Control (MAC) Control Element (CE) may be used to indicate the activation or updating of the pathloss RS.

Figure 2:
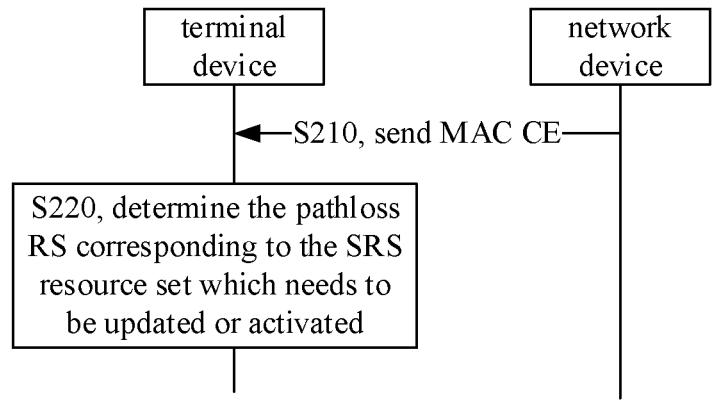
FIG. 2 is a schematic diagram of a method for activating or updating a pathloss reference signal corresponding to a sounding reference signal according to an embodiment of the present disclosure.

Specifically, FIG. 2 is a schematic flowchart of a method 200 for activating or updating a pathloss reference signal corresponding to a sounding reference signal according to an embodiment of the present disclosure. As shown in FIG. 2, the method 200 includes:

In S210, a MAC CE is sent, that is, a network device sends a MAC CE to a terminal device. The MAC CE includes at least one SRS resource set field and/or at least one pathloss RS field, the at least one SRS resource set field is used to indicate at least one SRS resource set, and the at least one pathloss RS field is used to indicate at least one pathloss RS corresponding to the at least one SRS resource set.

It should be understood that the above type of MAC CE can be distinguished by a logical channel identifier (LCID).

For example, the header of a MAC Protocol Data Unit (PDU) where the MAC CE is located or the header of a MAC subPDU where the MAC CE is located includes an LCID field, and the LCID field is used to indicate the type of the MAC CE.

In addition, the value of the LCID used to indicate the MAC CE type in embodiments of the present disclosure can be set according to actual applications.

For example, any value between 33 and 46 can be selected, but embodiments of the present disclosure are not limited to this.

According to some embodiments, the MAC CE may further include a serving cell identity field. The serving cell identity field is used to indicate the ID of a serving cell which the terminal device camps on. The size of the serving cell identity field can be set according to the maximum number of serving cells.

For example, if the maximum number of serving cells is 32, the corresponding serving cell identity field occupies 5 bits.

According to some embodiments, the MAC CE further includes a bandwidth part (BWP) identity field. The bandwidth part identity field is used to indicate the BWP ID corresponding to the terminal device. The size of the bandwidth part identity field can be set according to the maximum number of bandwidth parts.

For example, if the maximum number of the bandwidth parts is 4, the corresponding bandwidth part identity field occupies 2 bits.

According to some embodiments, the MAC CE may further include a reserved bit, denoted by "R", but embodiments of the present disclosure are not limited to this.

It should be understood that the method 200 in embodiments of the present disclosure may be performed by a terminal device and a network device.

For example, the terminal device may be the terminal device shown in FIG. 1, and the network device may be the network device shown in FIG. 1, but embodiments of the present disclosure are not limited to this.

As shown in FIG. 2, the method 200 further includes:

In S220, the pathloss RS corresponding to the SRS resource set that is to be updated or activated is determined. The terminal device receives the MAC CE sent by the network device, and according to the MAC CE, the terminal device updates or activates the at least one pathloss RS corresponding to the at least one SRS resource set as indicated by the MAC CE.

The network device may configure one or more SRS resource sets for the terminal device, and may also configure one or more pathloss RSs, and there is a corresponding relationship between the SRS resource sets and the pathloss RSs.

For example, the maximum number of SRS resource sets is usually 16, and the maximum number of pathloss RSs is usually 8 or 16.

In addition, one SRS resource set usually corresponds to one pathloss RS, and in some other embodiments, one pathloss RS may correspond to one or more SRS resource sets, embodiments of the present disclosure do not impose specific limitations on this.

According to some embodiments, the network device may configure the one or more SRS resource sets and/or configure one or more pathloss RSs for the terminal device through an RRC message, and embodiments of the present disclosure are not limited to this.

It should be understood that the MAC CE in embodiments of the present disclosure may have multiple forms.

For example, at least one SRS resource set field and/or at least one pathloss RS field included in the MAC CE may have different setting modes. In the following, various situations will be described in detail with reference to FIGS. 3 to 14. FIGS. 3 to 14 show several different MAC CE formats, respectively.

Optionally, as a first embodiment, the MAC CE may include at least one SRS resource set field and at least one pathloss RS field, and the at least one SRS resource set field corresponds to the at least one pathloss RS field in a one-to-one correspondence. That is, one SRS resource set field corresponds to one pathloss RS field, and one SRS resource set field in the at least one SRS resource set field is used to indicate the identity (ID) of one SRS resource set in the at least one SRS resource set, and one pathloss RS field in the at least one pathloss RS field is used to indicate the ID of one pathloss RS in the at least one pathloss RS.

Optionally, since there may be a situation where multiple SRS resource sets correspond to the same pathloss RS, the at least one pathloss RS field in the MAC CE may be that multiple pathloss RS fields includes the ID of the same pathloss.

It should be understood that since the SRS resource set field is used to indicate the ID of a SRS resource set, and the pathloss RS field is used to indicate the ID of a pathloss RS, the size of each SRS resource set field is related to the number of SRS resource sets, and the size of each pathloss RS field is related to the number of pathloss RSs.

According to some embodiments, the method 200 may further include: determining, by the terminal device, the size of each SRS resource set field in the at least one SRS resource set field according to the number of the at least one SRS resource set field.

For example, as shown in FIGS. 3 to 6, assuming that the maximum number of the at least one SRS resource set is 16, each SRS resource set field occupies 4 bits.

Similarly, the method 200 may further include: determining, by the terminal device, the size of each pathloss RS field in the at least one pathloss RS field according to the number of the at least one pathloss RS field.

Figure 3:
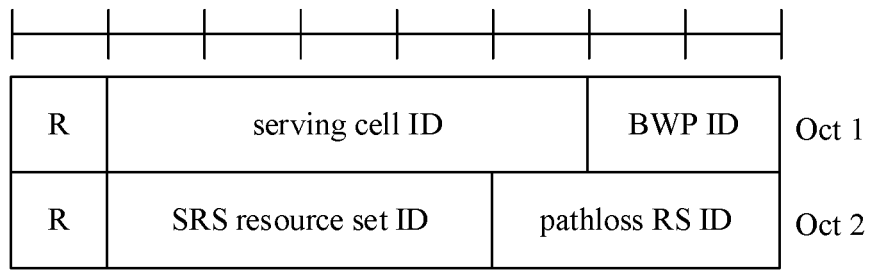
FIG. 3 is a schematic diagram of a MAC CE format according to an embodiment of the present disclosure.
Figure 4:
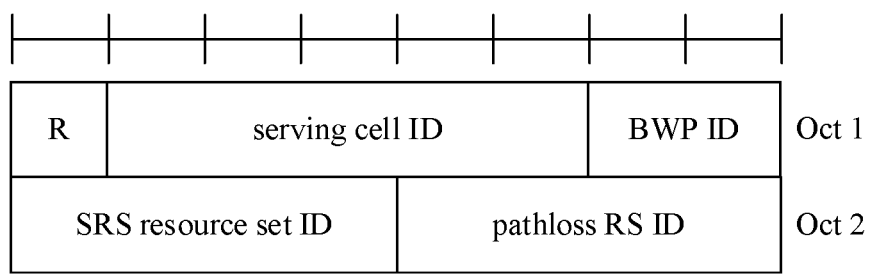
FIG. 4 is a schematic diagram of another MAC CE format according to an embodiment of the present disclosure.
Figure 5:
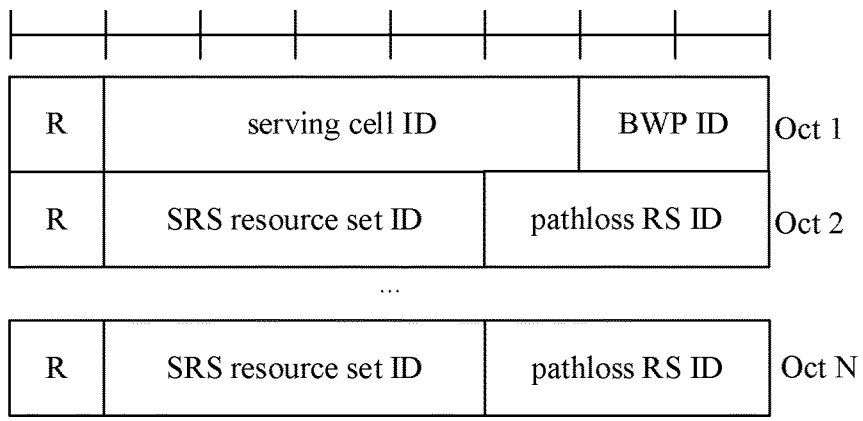
FIG. 5 is a schematic diagram of another MAC CE format according to an embodiment of the present disclosure.

For example, as shown in FIGS. 3 and 5, assuming that the maximum number of the at least one pathloss RS is 8, each pathloss RS field occupies 3 bits. For another example, as shown in FIGS. 4 and 6, assuming that the maximum number of the at least one pathloss RS is 16, each pathloss RS field occupies 4 bits.

In the first embodiment, one SRS resource set field corresponds to one pathloss RS field, and for any MCA CE, the MAC CE can be used to indicate the pathloss RS(s) corresponding to one or more SRS resource sets.

For example, as shown in FIGS. 3 and 4, one MAC CE may only be used to indicate one pathloss RS corresponding to one SRS resource set, and the MCA CE includes one SRS resource set field and one pathloss RS field. The SRS resource set field includes the ID of the SRS resource set, and the pathloss RS field includes the ID of the pathloss RS corresponding to the SRS resource set. The terminal device determines the pathloss RS corresponding to the one SRS resource set that needs to be activated or updated according to the MCA CE. If it is necessary to activate or update the pathloss RSs corresponding to multiple SRS resource sets, multiple MAC CEs can be sent to the terminal device.

Figure 6:
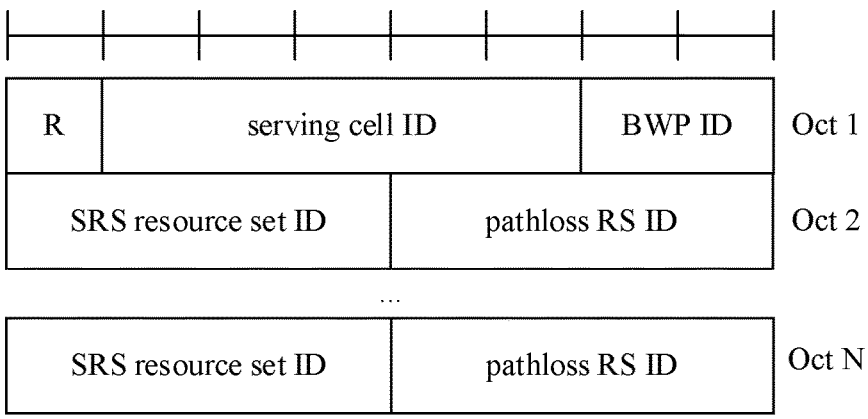
FIG. 6 is a schematic diagram of another MAC CE format according to an embodiment of the present disclosure.

For another example, as shown in FIGS. 5 and 6, one MCA CE can be used to indicate the pathloss RSs corresponding to multiple SRS resource sets, and the MCA CE includes multiple SRS resource set fields and multiple pathloss RS fields. One SRS resource set field includes the ID of one SRS resource set, and a corresponding pathloss RS field includes the ID of a pathloss RS corresponding to the SRS resource set. Assuming that the MCA CE includes N octets (Oct) as shown in FIG. 5 and FIG. 6, the MCA CE can be used to indicate at least N−1 SRS resource sets and their corresponding pathloss RSs, so that the terminal device can update of activate the pathloss RSs corresponding to the N−1 SRS resource sets according to the MAC CE.

Optionally, as a second embodiment, the situation where the MAC CE includes at least one SRS resource set field and at least one pathloss RS field is still taken as an example. The second embodiment differs from the first embodiment in that the MAC CE specifically includes multiple SRS resource set fields, the multiple SRS resource set fields correspond to multiple SRS resource sets configured for the terminal device one to one, and each SRS resource set field in the multiple SRS resource set fields is used to indicate whether it is needed to update or activate the pathloss RS for a corresponding SRS resource set, that is, each SRS resource set field is no longer the ID of a SRS resource set in the first embodiment.

In addition, a SRS resource set field expressed as a first value in the multiple SRS resource set fields is the at least one SRS resource set field. That is, if a certain SRS resource set field in the multiple SRS resource set fields is the first value, then the SRS resource set field belongs to at least one SRS resource set field in S210, that is, the pathloss RS for the SRS resource set corresponding to the SRS resource set field needs to be updated or activated. On the contrary, if a certain SRS resource set field in the multiple SRS resource set fields is not equal to the first value, then the SRS resource set field does not belong to the at least one SRS resource set field in the above S210, that is, the pathloss RS for the SRS resource set corresponding to the SRS resource set field is not needed to be updated or activated.

The network device may configure multiple SRS resource sets for the terminal device, and multiple SRS resource set fields having a one-to-one correspondence to the multiple SRS resource sets are set. Some or all of the multiple SRS resource set fields may belong to at least one SRS resource set field. In the MAC CE, the at least one pathloss RS field is set in a one-to-one correspondence with the at least one SRS resource set field. One pathloss RS field in the at least one pathloss RS field is used to indicate the ID of one pathloss RS in the at least one pathloss RS.

It should be understood that since the pathloss RS field is used to indicate the ID of the pathloss RS, the size of each pathloss RS field is related to the number of pathloss RSs.

According to some embodiments, the method 200 may further include: determining, by the terminal device, the size of each pathloss RS field in the at least one pathloss RS field according to the number of the at least one pathloss RS field.

Figure 7:
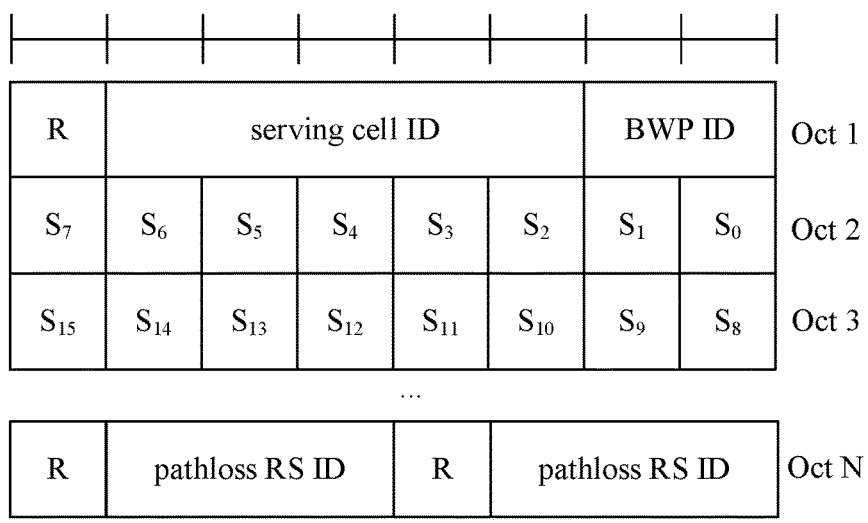
FIG. 7 is a schematic diagram of another MAC CE format according to an embodiment of the present disclosure.
Figure 8:
FIG. 8 is a schematic diagram of another MAC CE format according to an embodiment of the present disclosure.
Figure 9:
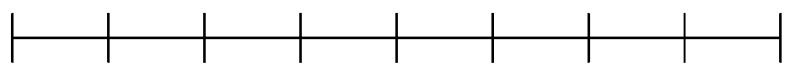
FIG. 9 is a schematic diagram of another MAC CE format according to an embodiment of the present disclosure.

For example, as shown in FIG. 7 and FIG. 9, assuming that the maximum number of the at least one pathloss RS is 8, each pathloss RS field occupies 3 bits. For another example, as shown in FIG. 8, assuming that the maximum number of the at least one pathloss RS is 16, each pathloss RS field occupies 4 bits.

In addition, each SRS resource set field in the multiple SRS resource set fields is used to indicate whether the pathloss RS for a corresponding SRS resource set needs to be updated or activated. Therefore, each SRS resource set field can be set to occupy only 1 bit.

For example, if the SRS resource set field is "1", it means that the SRS resource set field is the first value, that is, the pathloss RS for the SRS resource set corresponding to the SRS resource set field needs to be updated or activated, and a pathloss RS field corresponding to the SRS resource set field is configured to indicate the ID of the pathloss RS for the SRS resource set that needs to be updated or activated. If the SRS resource set field is "0", it means that the SRS resource set field is not the first value, that is, the pathloss RS for the SRS resource set corresponding to the SRS resource set field does not need to be updated or activated.

According to some other embodiments, each SRS resource set field in the multiple SRS resource set fields may be set to occupy multiple bits, and embodiments of the present disclosure do not impose specific limitations on this.

The multiple SRS resource set fields in the MAC CE in the second embodiment may be consecutive or inconsecutive. Specifically, as a first case, the multiple SRS resource set fields may be consecutive.

For example, the MAC CE may include an SRS resource set bitmap, and the multiple SRS resource set fields are multiple consecutive bits included in the SRS resource set bitmap.

For example, as shown in FIGS. 7 and 8, assuming that the terminal device has a maximum of 16 SRS resource sets, the corresponding SRS resource set bitmap included in the MCA CE can be set as 16 bits, that is, $S_0$ to $S_{15}$ in Oct2 and Oct3 as shown in FIG. 7 and FIG. 8. Each bit correspondingly represents an SRS resource set field, and the MCA CE includes a total of 16 SRS resource set fields. The sequencing order of the 16 SRS resource set fields may be as shown in FIG. 7 or 8, or other sequencing order may be adopted, and embodiments of the present disclosure do not impose specific limitations on this.

For at least one SRS resource set field whose bit value is "1" in the bitmap formed by the 16 SRS resource set fields, at least one pathloss RS field corresponding to the at least one SRS resource set field one to one is set thereafter, and each pathloss RS field includes the ID of a pathloss RS, indicating the terminal device to update or activate the pathloss RS.

For example, assuming that the value of $S_3$ is "1", then a pathloss RS field corresponding to $S_3$ is set. The pathloss RS field includes the ID of a pathloss RS, and the terminal device updates or activates the ID of the pathloss RS for the SRS resource set corresponding to $S_3$.

On the contrary, for other SRS resource set fields whose bit values are "0" in the bitmap formed by the 16 SRS resource set fields, the pathloss RS field may not be set, or the pathloss RS field may be set, but the terminal device does not need to activate or update the ID of the pathloss RS that is carried in the pathloss RS field.

It should be understood that, in the first case, if a pathloss RS field is not set for the pathloss RS which the terminal device does not need to activate or update (i.e., when the value of a bit in the SRS resource set bitmap is not the first value, a pathloss RS field corresponding to the bit is not set), the size of the MAC CE depends on the number of pathloss RSs for the SRS resource sets that the terminal device needs to update or activate.

According to some other embodiments, as another case, the multiple SRS resource set fields may be inconsecutive.

For example, the MAC CE includes multiple SRS resource set fields, and further includes multiple pathloss RS fields. The multiple pathloss RS fields have a one-to-one correspondence with the multiple SRS resource set fields.

For example, a first pathloss RS field in the multiple pathloss RS fields corresponds to a first SRS resource set field in the multiple SRS resource set fields, and the first pathloss RS field and the first SRS resource set field are consecutive. The first SRS resource set field is any one of the multiple SRS resource set fields, and the first pathloss RS field is a field corresponding to the first SRS resource set field among the multiple pathloss RS fields.

The first SRS resource set field is used to indicate whether the terminal device activates or updates the first pathloss RS for the corresponding first SRS resource set, and the first pathloss RS field is used to indicate the ID of the first pathloss RS, that is, the first pathloss RS corresponds to the first SRS resource set which corresponds to the first SRS resource set field.

In this case, the size of the MAC CE depends on the number of SRS resource sets configured by the network device for the terminal device. If the number of SRS resource sets is fixed, then the size of the MAC CE is fixed.

For example, as shown in FIG. 9, assuming that the terminal device has a maximum of 16 SRS resource sets, then the MAC CE can be set with 16 SRS resource set fields, which are represented as $S_0$ to $S_{15}$ shown in FIG. 9. Each SRS resource set field corresponds to one pathloss RS field, that is, the MAC CE has 16 pathloss RS fields. If a certain SRS resource set in the 16 SRS resource set fields is "1", for example, if $S_1$ is "1", the terminal device obtains the ID of a pathloss RS in one pathloss RS field after the $S_1$, and the pathloss RS indicated by the ID is the pathloss RS for the SRS resource set corresponding to $S_1$ that the terminal device needs to update or activate. Conversely, if a certain SRS resource set field is not "1", for example, if $S_2$ is "0", it means that the pathloss RS for the SRS resource set corresponding to $S_2$ does not need to be updated or activated.

Optionally, as a third embodiment, a situation where the MAC CE includes at least one SRS resource set field and at least one pathloss RS field is taken as an example. The third embodiment differs from the previous two embodiments in that, it is assumed that among the multiple SRS resource sets configured by the network device for the terminal device, there is no situation where multiple SRS resource sets correspond to the same pathloss RS, for example, multiple SRS resource sets have a one-to-one correspondence with multiple pathloss RSs. Referring to the manner for setting the multiple SRS resource set fields in the second embodiment, multiple pathloss RS fields can also be set.

For example, in the second embodiment, the SRS resource set fields can be set as a bitmap, and the pathloss RSs can also be set as a bitmap in the third embodiment.

Specifically, the MAC CE may include multiple pathloss RS fields, the multiple pathloss RS fields have a one-to-one correspondence with multiple pathloss RSs configured by the network device for the terminal device, and each pathloss RS field is used to indicate whether a corresponding pathloss RS needs to be updated or activated.

For example, the multiple pathloss RS fields may be a pathloss RS bitmap. Multiple bits included in the pathloss RS bitmap have a one-to-one correspondence with multiple pathloss RSs configured by the network device for the terminal device. Each bit in the pathloss RS bitmap is used to indicate whether a corresponding pathloss RS needs to be updated or activated. That is, if a pathloss RS field in the multiple pathloss RS fields is the first value, then the pathloss RS field belongs to at least one pathloss RS field in above S210, that is, the pathloss RS for the SRS resource set corresponding to the pathloss RS field needs to be updated or activated. On the contrary, if a pathloss RS field in the multiple pathloss RS fields is not equal to the first value, then the pathloss RS field It does not belong to at least one pathloss RS field in the above S210, that is, the pathloss RS for the SRS resource set corresponding to the pathloss RS field does not need to be updated or activated.

The network device can configure multiple pathloss RSs for the terminal device, and multiple pathloss RS fields having a one-to-one correspondence with the multiple pathloss RSs are set. Some or all of the multiple pathloss RS fields may belong to the at least one pathloss RS field. In the MAC CE, at least one SRS resource set field having a one-to-one correspondence with the at least one pathloss RS field is set. One SRS resource set field in the at least one SRS resource set field is used to indicate the identity of one SRS resource set in the at least one SRS resource set.

It should be understood that since the SRS resource set field is used to indicate the ID of a SRS resource set, the size of each SRS resource set field is related to the number of SRS resource sets.

According to some embodiments, the method 200 may further include: determining, by the terminal device, the size of each SRS resource set field in the at least one SRS resource set field according to the number of the at least one SRS resource set field.

Figure 10:
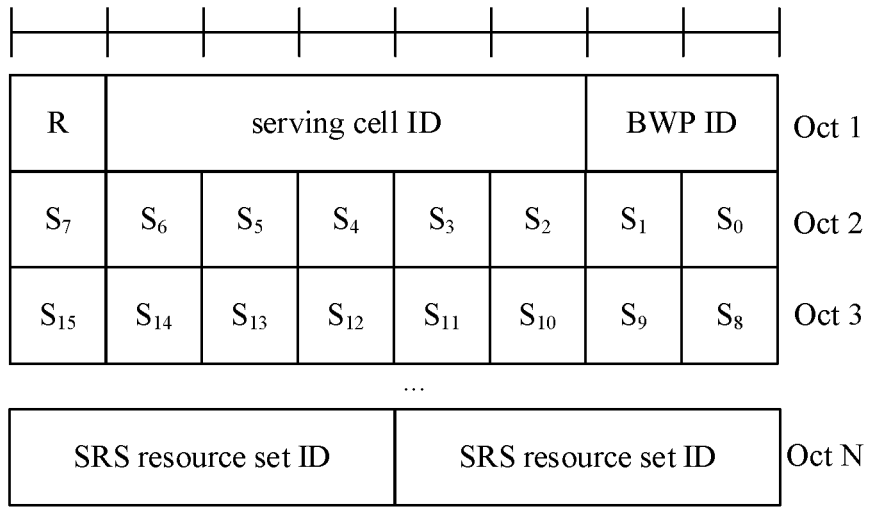
FIG. 10 is a schematic diagram of another MAC CE format according to an embodiment of the present disclosure.
Figure 11:
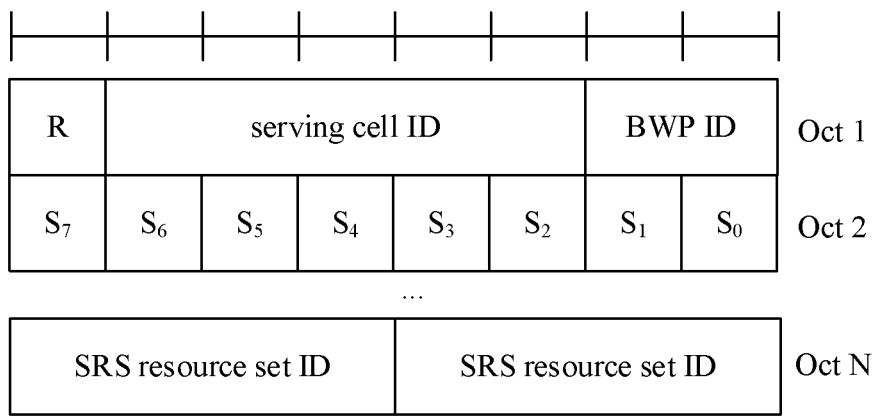
FIG. 11 is a schematic diagram of another MAC CE format according to an embodiment of the present disclosure.

For example, as shown in FIG. 10 and FIG. 11, assuming that the maximum number of the at least one SRS resource set is 16, each SRS resource set field occupies 4 bits.

In addition, each pathloss RS field in the multiple pathloss RS fields is used to indicate whether the pathloss RS for a corresponding SRS resource set needs to be updated or activated. Therefore, each pathloss RS field can be set to occupy only 1 bit.

For example, if a certain pathloss RS field is "1", it means that the pathloss RS field is the first value, and then a SRS resource set field corresponding to the pathloss RS field is set in the MAC CE. The SRS resource set field includes the ID of the SRS resource set, and the pathloss RS for the SRS resource set indicated by the ID needs to be updated or activated. If the pathloss RS field is "0", it means that the pathloss RS field is not the first value, that is, the pathloss RS for the SRS resource set corresponding to the pathloss RS field does not need to be updated or activated.

According to some other embodiments, each pathloss RS field in the multiple pathloss RS fields may also be set to occupy multiple bits, and embodiments of the present disclosure do not impose specific limitations on this.

It should be understood that, similar to the MAC CE in the second embodiment, multiple pathloss RS fields in the MAC CE may be consecutive or inconsecutive in the third embodiment. Specifically, a situation where the multiple SRS resource set fields are consecutive is taken as an example, that is, the MAC CE may include a pathloss RS bitmap, and the multiple pathloss RS fields are consecutive multiple bits included in the pathloss RS bitmap.

For example, as shown in FIG. 10, assuming that the terminal device has at most 16 pathloss RSs, and the 16 pathloss RSs correspond to 16 SRS resource sets one to one, and accordingly the pathloss RS bitmap included in the MCA CE can be set to 16 bits, that is, $S_0$ to $S_{15}$ in Oct2 and Oct3 as shown in FIG. 10. Each bit correspondingly represents one pathloss RS field, and the MCA CE includes a total of 16 pathloss RS fields. Or, as shown in FIG. 11, assuming that the terminal device has at most 8 pathloss RSs, and the 8 pathloss RSs correspond to 8 SRS resource sets one to one, and accordingly the pathloss RS bitmap included in the MCA CE can be set to 8 bits, that is, $S_0$ to $S_7$ in Oct2 as shown in FIG. 11. Each bit correspondingly represents one pathloss RS field, and the MCA CE includes a total of 8 pathloss RS fields.

According to some embodiments, the sequencing order of the 16 pathloss RS fields may be as shown in FIG. 10, and the sequencing order of the 8 pathloss RS fields may be as shown in FIG. 11, or other sequencing order may be adopted, and embodiments of the present disclosure do not impose specific limitations on this.

As shown in FIG. 10 or FIG. 11, for at least one pathloss RS field whose bit value is "1" in the bitmap formed by the 16 or 8 pathloss RS fields, at least one SRS resource set field corresponding to the at least one pathloss RS field one to one is set thereafter. Each SRS resource set field includes the ID of a SRS resource set, indicating that the terminal device updates or activates a pathloss RS corresponding to the SRS resource set.

For example, assuming that the value of $S_3$ is "1", a SRS resource set field corresponding to $S_3$ is set. The SRS resource set field includes the ID of a SRS resource set, and the terminal device updates or activates a pathloss RS corresponding to the ID of $S_3$ in the pathloss RS for the SRS resource set.

On the contrary, for other pathloss RS fields whose bit values are "0" in the bitmap formed by the 16 or 8 pathloss RS fields, a SRS resource set field may not be set, or the SRS resource set field may be set, but the terminal device does not need to activate or update the ID of the pathloss RS for the SRS resource set indicated by the SRS resource set field.

It should be understood that, in the case of setting the pathloss RS bitmap, if it is not needed for the terminal device to activate or update the pathloss RS for a certain SRS resource set, no SRS resource set bit is set (i.e., when the value of a bit in the pathloss RS bitmap is not the first value, a SRS resource set field corresponding to the bit is not set), the size of the MAC CE depends on the number of pathloss RSs for the SRS resource sets that the terminal device needs to update or activate.

It should be understood that multiple pathloss RS fields in the MAC CE may also be inconsecutive. For details, refer to the second case in the second embodiment for setting of the pathloss RS fields. For brevity, details are not repeated here.

As a fourth embodiment, a situation where the MAC CE includes at least one SRS resource set field and at least one pathloss RS field is taken as an example. The fourth embodiment differs from the previous three embodiments in that, the MAC CE includes the at least one SRS resource set field and at least one pathloss RS field, the at least one SRS resource set field corresponds to the at least one pathloss RS field one to one, and each pathloss RS field is a pathloss RS bitmap. Specifically, it is assumed that the first pathloss RS field is any one of multiple pathloss RS fields, the first SRS resource set field is any one of multiple SRS resource set fields, and the first SRS resource set field corresponds to the first SRS resource set field. The first SRS resource set field is used to indicate the ID of the first SRS resource set in the at least one SRS resource set. The first pathloss RS field is a bitmap, which is called the first pathloss RS bitmap here. Multiple bits included in the first pathloss RS bitmap correspond to multiple pathloss RSs configured for the terminal device one to one. There are one or more first bits in the first pathloss RS bitmap that satisfy: the values of the first bits are the first value. The pathloss RS corresponding to the first bit is the pathloss RS corresponding to the first SRS resource set.

It should be understood that since the SRS resource set field is used to indicate the ID of a SRS resource set, the size of each SRS resource set field is related to the number of SRS resource sets.

According to some embodiments, the method 200 may further include: determining, by the terminal device, the size of each SRS resource set field in the at least one SRS resource set field according to the number of the at least one SRS resource set field.

For example, as shown in FIG. 12, assuming that the maximum number of the at least one SRS resource set is 16, each SRS resource set field occupies 4 bits.

It should be understood that the total number of bits in each bitmap of at least one pathloss RS bitmap included in the MAC CE is determined by the number of pathloss RSs for the terminal device.

For example, if the maximum number of pathloss RSs is 8, each pathloss RS bitmap has 8 bits; if the maximum number of pathloss RSs is 16, each pathloss RS bitmap has 16 bits.

For example, as shown in FIG. 12, the MAC CE includes at least one SRS resource set field, and each SRS resource set field includes the ID of an SRS resource set to indicate that the terminal device needs to activate or update the pathloss RS corresponding to the at least one SRS resource set. For any one SRS resource set field in the at least one SRS resource set field, for example, taking the SRS resource set field in Oct2 (it is it is referred to as the first SRS resource set field here) as an example, the first SRS resource set field includes the ID of the first SRS resource set. What corresponds to the first SRS resource set field is the first pathloss RS field. The first pathloss RS field is a bitmap, here it is called the first pathloss RS bitmap. It is assumed that the terminal device has 8 pathloss RSs, that is, as shown in Oct3 in FIG. 12, the first pathloss RS bitmap has 8 bits, and each bit corresponds to a pathloss RS.

Assuming that only the value of $S_5$ is "1" in the first pathloss RS bitmap corresponding to the first SRS resource set field, that is, the first value is "1", and the remaining bits in the first pathloss RS bitmap are all "0", it means that the pathloss RS corresponding to the first SRS resource set indicated by the first SRS resource set field is $S_5$, and the ID of the pathloss RS corresponding to the SRS resource set that the terminal device activates or updates is $S_5$.

According to some embodiments, the arrangement of at least one SRS resource set field and the corresponding pathloss RS field included in the MAC CE may be as shown in FIG. 12, or may be set in other ways, and embodiments of the present disclosure do not impose specific limitations on this.

In the above four embodiments, the MAC CE includes two types of fields: the SRS resource set field and the pathloss RS field, but the MAC CE may also include only one of the SRS resource set field and the pathloss RS field.

Optionally, as a fifth embodiment, the MAC CE may include a pathloss RS field, but does not include a SRS resource set field. Specifically, the MAC CE may include multiple pathloss RS fields, and the multiple pathloss RS fields correspond to multiple SRS resource sets and pathloss RSs configured for the terminal device one to one. Generally, one SRS resource set corresponds to only one pathloss RS. Therefore, multiple corresponding pathloss RS fields can be arranged in a certain order of multiple SRS resource sets configured for the terminal device, and one pathloss RS field in the multiple pathloss RS fields is used to indicate the ID of a pathloss RS for a corresponding SRS resource set.

In addition, the method 200 may further include: according to the ID of a pathloss RS indicated by each pathloss RS field in the multiple pathloss RS fields, determining, by the terminal device, whether to update or activate the pathloss RS for the SRS resource set corresponding to each pathloss RS field.

According to some embodiments, considering that there may be a situation where multiple SRS resource sets correspond to the same pathloss RS, there may be a situation where multiple pathloss RS fields include the same pathloss RS ID, that is, multiple SRS resource sets corresponding to the multiple pathloss RS fields correspond to the same pathloss RS.

It should be understood that since each pathloss RS field includes the ID of a pathloss RS, the size of each pathloss RS field is related to the number of pathloss RSs.

According to some embodiments, the method 200 may further include: determining, by the terminal device, the size of each pathloss RS field in the at least one pathloss RS field according to the number of the at least one pathloss RS field.

For example, assuming that the maximum number of the at least one pathloss RS is 8, each pathloss RS field occupies 3 bits. For another example, as shown in FIG. 13, assuming that the maximum number of the at least one pathloss RS is 16, each pathloss RS field occupies 4 bits.

Specifically, taking FIG. 13 as an example, multiple pathloss RS fields corresponding to multiple SRS resource sets for the terminal device are set. Each pathloss RS field corresponds to one SRS resource set, and each pathloss RS field includes the ID of a pathloss RS for a SRS resource set corresponding to the pathloss RS field. The terminal device can determine whether the pathloss RS corresponding to each SRS resource set needs to be updated or activated according to the ID of the pathloss RS included in each pathloss RS field.

For example, assuming that the ID of the pathloss RS included in the pathloss RS field corresponding to a certain SRS resource set is changed, it means that the terminal device needs to activate the pathloss RS for the SRS resource set corresponding to the pathloss RS field.

Optionally, as a sixth embodiment, the MAC CE may include a SRS resource set field, but does not include a pathloss RS field. Specifically, it is assumed here that among the multiple SRS resource sets configured by the network device for the terminal device, the situation where different SRS resource sets correspond to the same pathloss RS does not exist.

For example, if multiple SRS resource sets correspond to multiple pathloss RSs one to one, the MAC CE may include multiple SRS resource set fields, and the multiple SRS resource set fields correspond to multiple SRS resource sets and pathloss RSs configured for the terminal device one to one.

Since one pathloss RS corresponds to only one SRS resource set, multiple corresponding SRS resource set fields can be arranged in a certain order of multiple pathloss RSs configured for the terminal device. One of the SRS resource set fields is used to indicate the ID of a corresponding SRS resource set.

In addition, the method 200 may further include: according to the ID of a SRS resource set indicated by each SRS resource set field in the multiple SRS resource set fields, determining whether to update or activate a pathloss RS for the SRS resource set corresponding to each SRS resource set field.

According to some embodiments, assuming that multiple pathloss RSs correspond to the same SRS resource set, there may be a situation where multiple SRS resource set fields include the same SRS resource set ID, that is, multiple pathloss RSs corresponding to the multiple SRS resource set fields corresponds to the same SRS resource set.

It should be understood that since the SRS resource set field is used to indicate the ID of a SRS resource set, the size of each SRS resource set field is related to the number of SRS resource sets.

According to some embodiments, the method 200 may further include: determining, by the terminal device, the size of each SRS resource set field in the at least one SRS resource set field according to the number of the at least one SRS resource set field.

For example, as shown in FIG. 14, assuming that the maximum number of the at least one SRS resource set is 16, each SRS resource set field occupies 4 bits.

Specifically, taking FIG. 14 as an example, multiple SRS resource set fields corresponding to multiple pathloss RSs for the terminal device are set. Each SRS resource set field corresponds to one pathloss RS, and each SRS resource set field includes ID of a SRS resource set corresponding to the SRS resource set field. According to the ID of the SRS resource set included in each SRS resource set field and the pathloss RS corresponding to each SRS resource set field, the terminal device can determine whether the pathloss RS corresponding to each SRS resource set needs to be updated or activated.

For example, assuming that the ID of the SRS resource set included in the SRS resource set field corresponding to a certain pathloss RS is changed, it means that the terminal device needs to activate the pathloss RS for the SRS resource set corresponding to the SRS resource set field.

In view of the above, in the method for activating or updating a pathloss reference signal corresponding to a sounding reference signal in embodiments of the present disclosure, a variety of different MAC CE formats can be flexibly set, and the pathloss RS ID for the SRS resource set can be activated or updated based on the MAC CE, and thus transmission delay is greatly reduced.

It should be understood that, in various embodiments of the present disclosure, the sequence numbers of the above-mentioned processes do not mean the order of execution. The execution order of processes should be determined by their functions and internal logics, and the sequence numbers of the above-mentioned processes should not be construed as constituting any limitation on the implementations of the present disclosure.

The method for activating or updating a path loss reference signal corresponding to a sounding reference signal according to embodiments of the present disclosure is described in detail above with reference to FIGS. 1 to 14. The following describes a terminal device and a network device according to embodiments of the present disclosure with reference to FIGS. 15 to 19.

As shown in FIG. 15, a terminal device 300 according to an embodiment of the present disclosure includes a processing unit 310 and a transceiving unit 320. Specifically, the transceiving unit is configured to receive a MAC CE sent by a network device. The MAC CE includes at least one SRS resource set field and/or at least one pathloss RS field, the at least one SRS resource set field is used to indicate at least one SRS resource set, and the at least one pathloss RS field is used to indicate at least one pathloss RS corresponding to the at least one SRS resource set. The processing unit 310 is configured to update or activate the at least one pathloss RS corresponding to the at least one SRS resource set according to the MAC CE.

Optionally, as an embodiment, the MAC CE includes the at least one SRS resource set field and the at least one pathloss RS field.

Optionally, as an embodiment, the at least one SRS resource set field has a one-to-one correspondence with the at least one pathloss RS field, one SRS resource set field in the at least one SRS resource set field is used to indicate an identity of one SRS resource set in the at least one SRS resource set, and one pathloss RS field in the at least one pathloss RS field is used to indicate an identity of one pathloss RS in the at least one pathloss RS.

Optionally, as an embodiment, the MAC CE includes a plurality of SRS resource set fields, the plurality of SRS resource set fields have a one-to-one correspondence with a plurality of SRS resource sets configured for the terminal device 300, and each SRS resource set field in the plurality of SRS resource set fields is used to indicate whether a pathloss RS for a corresponding SRS resource set needs to be updated or activated;

a SRS resource set field expressed as a first value in the plurality of SRS resource set fields is the at least one SRS resource set field;

the at least one SRS resource set field has a one-to-one correspondence with the at least one pathloss RS field, and one pathloss RS field in the at least one pathloss RS field is used to indicate an identity of one pathloss RS in the at least one pathloss RS.

Optionally, as an embodiment, the MAC CE includes a SRS resource set bitmap, and the plurality of SRS resource set fields are consecutive multiple bits included in the SRS resource set bitmap.

Optionally, as an embodiment, the MAC CE includes a plurality of pathloss RS fields, the plurality of pathloss RS fields have a one-to-one correspondence with the plurality of SRS resource set fields, and at least one pathloss RS field in the plurality of pathloss RS fields have a one-to-one correspondence with the at least one SRS resource set field; and a first pathloss RS field in the plurality of pathloss RS fields corresponds to a first SRS resource set field in the plurality of SRS resource set fields, the first pathloss RS field and the first SRS resource set field are consecutive, the first pathloss RS field is used to indicate an identity of a first pathloss RS, and the first pathloss RS corresponds to a first SRS resource set corresponding to the first SRS resource set field.

Optionally, as an embodiment, if a plurality of SRS resource sets configured for the terminal device 300 have a one-to-one correspondence with a plurality of pathloss RSs, the MAC CE includes a pathloss RS bitmap, and a plurality of bits included in the pathloss RS bitmap have a one-to-one correspondence with the plurality of pathloss RSs, each bit in the pathloss RS bitmap is used to indicate whether a corresponding pathloss RS needs to be updated or activated, a pathloss RS field expressed as a first value in the plurality of pathloss RS fields is the at least one pathloss RS field, and the at least one pathloss RS field has a one-to-one correspondence with the at least one SRS resource set field, and one SRS resource set field in the at least one SRS resource set field is used to indicate an identity of one SRS resource set in the at least one SRS resource set.

Optionally, as an embodiment, the at least one SRS resource set field has a one-to-one correspondence with the at least one pathloss RS field, a first SRS resource set field in the at least one SRS resource set field is used to indicate an identity of a first SRS resource set in the at least one SRS resource set, and the first SRS resource set field corresponds to a first pathloss RS field in the at least one pathloss RS field, the first pathloss RS field is a first pathloss RS bitmap, and a plurality of bits included in the first pathloss RS bitmap have a one-to-one correspondence with a plurality of pathloss RSs configured for the terminal device 300, and a value of a first bit in the first pathloss RS bitmap is a first value, and a pathloss RS corresponding to the first bit is a pathloss RS corresponding to the first SRS resource set.

Optionally, as an embodiment, the MAC CE includes a plurality of pathloss RS fields, and the plurality of pathloss RS fields have a one-to-one correspondence with a plurality of SRS resource sets configured for the terminal device, one pathloss RS field in the plurality of pathloss RS fields is used to indicate an identity of a pathloss RS for a corresponding SRS resource set;

the processing unit 310 is further configured to:

determine whether to update or activate a pathloss RS for a SRS resource set corresponding to each pathloss RS field according to an identity of a pathloss RS indicated by each pathloss RS field in the plurality of pathloss RS fields.

Optionally, as an embodiment, the processing unit 310 is further configured to:

determine a size of each SRS resource set field in the at least one SRS resource set field according to the number of the at least one SRS resource set.

Optionally, as an embodiment, if a maximum number of the at least one SRS resource set is 16, each SRS resource set field occupies 4 bits.

Optionally, as an embodiment, the processing unit 310 is further configured to:

determine a size of each pathloss RS field in the at least one pathloss RS field according to the number of the at least one pathloss RS field.

Optionally, as an embodiment, if a maximum number of the at least one pathloss RS is 8, each pathloss RS field occupies 3 bits; and if the maximum number of the at least one pathloss RS is 16, each pathloss RS field occupies 4 bits.

Optionally, as an embodiment, the MAC CE further includes a serving cell identity field, and the serving cell identity field is used to indicate an identity of a serving cell which the terminal device 300 camps on.

Optionally, as an embodiment, the MAC CE further includes a bandwidth part identity field, and the bandwidth part identity field is used to indicate an identity of a bandwidth part corresponding to the terminal device 300.

Optionally, as an embodiment, a header of a MAC protocol data unit where the MAC CE is located includes a logical channel identifier field, and the logical channel identifier field is used to indicate a type of the MAC CE.

The above and other operations and/or functions of each unit in the terminal device 300 in embodiments of the present disclosure are used to implement the corresponding processes of the terminal device in each method in FIG. 1 to FIG. 14, and details will not be repeated here for brevity.

In view of the above, in the terminal device in embodiments of the present disclosure, a variety of different MAC CE formats can be flexibly set, and the pathloss RS ID for the SRS resource set can be activated or updated based on the MAC CE, and thus transmission delay is greatly reduced.

As shown in FIG. 16, a network device 400 according to an embodiment of the present disclosure includes a processing unit 410 and a transceiving unit 420. Specifically, the transceiving unit 420 is configured to send a MAC CE to a terminal device. The MAC CE includes at least one SRS resource set field and/or at least one pathloss RS field, the at least one SRS resource set field is used to indicate at least one SRS resource set, the at least one pathloss RS field is used to indicate at least one pathloss RS corresponding to the at least one SRS resource set, and the MAC CE is used to indicate the terminal device to update or activate the at least one pathloss RS corresponding to the at least one SRS resource set.

Optionally, as an embodiment, the MAC CE includes the at least one SRS resource set field and the at least one pathloss RS field.

Optionally, as an embodiment, the at least one SRS resource set field has a one-to-one correspondence with the at least one pathloss RS field, one SRS resource set field in the at least one SRS resource set field is used to indicate an identity of one SRS resource set in the at least one SRS resource set, and one pathloss RS field in the at least one pathloss RS field is used to indicate an identity of one pathloss RS in the at least one pathloss RS.

Optionally, as an embodiment, the MAC CE includes a plurality of SRS resource set fields, the plurality of SRS resource set fields have a one-to-one correspondence with a plurality of SRS resource sets configured by the network device 400 for the terminal device, and each SRS resource set field in the plurality of SRS resource set fields is used to indicate whether a pathloss RS for a corresponding SRS resource set needs to be updated or activated;

a SRS resource set field expressed as a first value in the plurality of SRS resource set fields is the at least one SRS resource set field;

the at least one SRS resource set field has a one-to-one correspondence with the at least one pathloss RS field, and one pathloss RS field in the at least one pathloss RS field is used to indicate an identity of one pathloss RS in the at least one pathloss RS.

Optionally, as an embodiment, the MAC CE includes a SRS resource set bitmap, and the plurality of SRS resource set fields are consecutive multiple bits includes in the SRS resource set bitmap.

Optionally, as an embodiment, the MAC CE includes a plurality of pathloss RS fields, the plurality of pathloss RS fields have a one-to-one correspondence with the plurality of SRS resource set fields, and at least one pathloss RS field in the plurality of pathloss RS fields have a one-to-one correspondence with the at least one SRS resource set field; and a first pathloss RS field in the plurality of pathloss RS fields corresponds to a first SRS resource set field in the plurality of SRS resource set fields, the first pathloss RS field and the first SRS resource set field are consecutive, the first pathloss RS field is used to indicate an identity of a first pathloss RS, and the first pathloss RS corresponds to a first SRS resource set corresponding to the first SRS resource set field.

Optionally, as an embodiment, if a plurality of SRS resource sets configured by the network device 400 for the terminal device have a one-to-one correspondence with a plurality of pathloss RSs, the MAC CE includes a pathloss RS bitmap, and a plurality of bits included in the pathloss RS bitmap have a one-to-one correspondence with the plurality of pathloss RSs, each bit in the pathloss RS bitmap is used to indicate whether a corresponding pathloss RS needs to be updated or activated, a pathloss RS field expressed as a first value in the plurality of pathloss RS fields is the at least one pathloss RS field, and the at least one pathloss RS field has a one-to-one correspondence with the at least one SRS resource set field, and one SRS resource set field in the at least one SRS resource set field is used to indicate an identity of one SRS resource set in the at least one SRS resource set.

Optionally, as an embodiment, the at least one SRS resource set field has a one-to-one correspondence with the at least one pathloss RS field, a first SRS resource set field in the at least one SRS resource set field is used to indicate an identity of a first SRS resource set in the at least one SRS resource set, and the first SRS resource set field corresponds to a first pathloss RS field in the at least one pathloss RS field, the first pathloss RS field is a first pathloss RS bitmap, and a plurality of bits included in the first pathloss RS bitmap have a one-to-one correspondence with a plurality of pathloss RSs configured by the network device 400 for the terminal device, and a value of a first bit in the first pathloss RS bitmap is a first value, and a pathloss RS corresponding to the first bit is a pathloss RS corresponding to the first SRS resource set.

Optionally, as an embodiment, the MAC CE includes a plurality of pathloss RS fields, and the plurality of pathloss RS fields have a one-to-one correspondence with a plurality of SRS resource sets configured by the network device 400 for the terminal device, a first pathloss RS field in the plurality of pathloss RS fields is used to indicate an identity of a first pathloss RS for a corresponding first SRS resource set;

the identity of the first pathloss RS is used to indicate the terminal device regarding whether to update or activate the first pathloss RS for the first SRS resource set corresponding to the first pathloss RS field.

Optionally, as an embodiment, the processing unit 410 is configured to:

determine a size of each SRS resource set field in the at least one SRS resource set field according to the number of the at least one SRS resource set.

Optionally, as an embodiment, if a maximum number of the at least one SRS resource set is 16, each SRS resource set field occupies 4 bits.

Optionally, as an embodiment, the processing unit 410 is configured to:

determine a size of each pathloss RS field in the at least one pathloss RS field according to the number of the at least one pathloss RS field.

Optionally, as an embodiment, if a maximum number of the at least one pathloss RS is 8, each pathloss RS field occupies 3 bits; and if the maximum number of the at least one pathloss RS is 16, each pathloss RS field occupies 4 bits.

Optionally, as an embodiment, the MAC CE further includes a serving cell identity field, and the serving cell identity field is used to indicate an identity of a serving cell which the terminal device camps on.

Optionally, as an embodiment, the MAC CE further includes a bandwidth part identity field, and the bandwidth part identity field is used to indicate an identity of a bandwidth part corresponding to the terminal device.

Optionally, as an embodiment, a header of a MAC protocol data unit where the MAC CE is located includes a logical channel identifier field, and the logical channel identifier field is used to indicate a type of the MAC CE.

The above and other operations and/or functions of each unit in the network device 400 in embodiments of the present disclosure are used to implement the corresponding processes of the network device in each method in FIG. 1 to FIG. 14, and details will not be repeated here for brevity.

In view of the above, in the network device in embodiments of the present disclosure, a variety of different MAC CE formats can be flexibly set, and the pathloss RS ID for the SRS resource set can be activated or updated based on the MAC CE, and thus transmission delay is greatly reduced.

Figure 17:
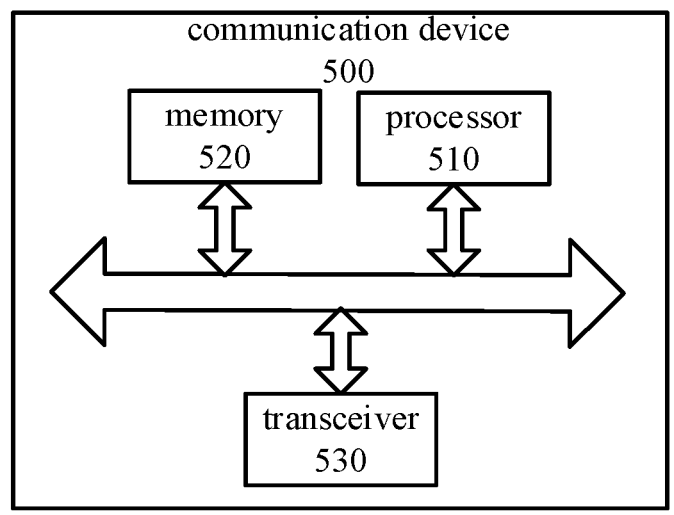
FIG. 17 is a schematic block diagram of a communication device according to an embodiment of the present disclosure.

FIG. 17 is a schematic structural diagram of a communication device 500 according to an embodiment of the present disclosure. The communication device 500 shown in FIG. 17 includes a processor 510, and the processor 510 may call and run a computer program from a memory to perform the method in embodiments of the present disclosure.

According to embodiments, as shown in FIG. 17, the communication device 500 may further include a memory 520. The processor 510 may call and run a computer program from the memory 520 to perform the method in embodiments of the present disclosure.

The memory 520 may be a separate device independent of the processor 510, or may be integrated in the processor 510.

According to embodiments, as shown in FIG. 17, the communication device 500 may further include a transceiver 530, and the processor 510 may control the transceiver 530 to communicate with other devices. Specifically, the transceiver may send information or data to other devices, or receive information or data sent by other devices.

The transceiver 530 may include a transmitter and a receiver. The transceiver 630 may further include one or more antennas.

According to embodiments, the communication device 500 may specifically be the network device according to an embodiment of the present disclosure, and the communication device 500 may implement the corresponding processes implemented by the network device in the method embodiments of the present disclosure.

According to embodiments, the communication device 500 may specifically be the mobile terminal/terminal device in embodiments of the present disclosure, and the communication device 500 may implement the corresponding processes implemented by the mobile terminal/terminal device in the method embodiments of the present disclosure. For brevity, details are not repeated here.

Figure 18:
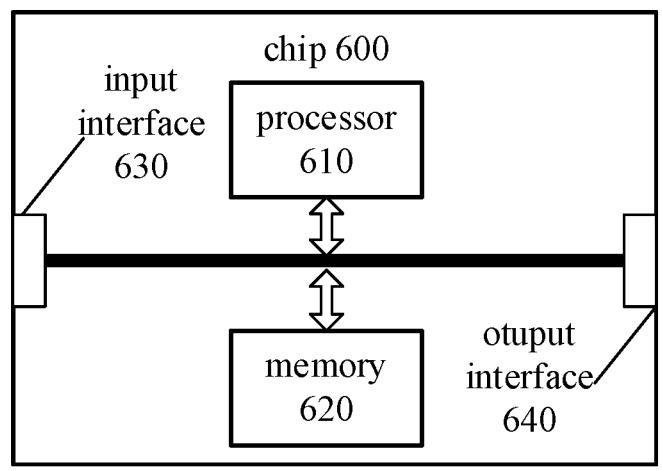
FIG. 18 is a schematic block diagram of a chip according to an embodiment of the present disclosure.

FIG. 18 is a schematic structural diagram of a chip according to an embodiment of the present disclosure. The chip 600 shown in FIG. 18 includes a processor 610, and the processor 610 can call and run a computer program from a memory to implement the method according to embodiments of the present disclosure.

According to embodiments, as shown in FIG. 18, the chip 600 may further include a memory 620. The processor 610 may call and run a computer program from the memory 620 to implement the method according to embodiments of the present disclosure.

The memory 620 may be a separate device independent of the processor 610, or may be integrated in the processor 610.

According to embodiments, the chip 600 may further include an input interface 630. The processor 610 may control the input interface 630 to communicate with other devices or chips, and specifically, the processor 610 can control the input interface to obtain information or data sent by other devices or chips.

According to embodiments, the chip 600 may further include an output interface 640. The processor 610 can control the output interface 640 to communicate with other devices or chips, and specifically, the processor 610 can control the output interface 640 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the chip can implement the corresponding processes implemented by the mobile terminal/ terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 19:
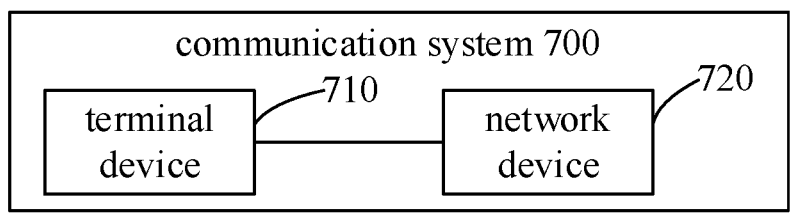
FIG. 19 is a schematic diagram of a communication system according to an embodiment of the present disclosure.

FIG. 19 is a schematic block diagram of a communication system 700 according to an embodiment of the present disclosure. As shown in FIG. 19, the communication system 700 includes a terminal device 710 and a network device 720.

The terminal device 710 may be used to implement the corresponding functions implemented by the terminal device in the foregoing method embodiments, and the network device 720 may be used to implement the corresponding functions implemented by the network device in the foregoing method embodiments. For brevity, details are not described herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive.

For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways.

For example, the device embodiments described above are merely illustrative.

For example, the division of the units is only a kind of logical function division. In practice, other division manner may be used.

For example, multiple units or components may be combined or integrated into another system, or some features may be ignored or not performed.

In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for activating or updating a pathloss reference signal corresponding to a sounding reference signal, the method comprising:
   receiving, by a terminal device, a Medium Access Control (MAC) Control Element (CE) sent by a network device, wherein the MAC CE comprises at least one Sounding Reference Signal (SRS) resource set field and/or at least one pathloss Reference Signal (RS) field, the at least one SRS resource set field is used to indicate at least one SRS resource set, and the at least one pathloss RS field is used to indicate at least one pathloss RS corresponding to the at least one SRS resource set; and
   updating or activating, by the terminal device, the at least one pathloss RS corresponding to the at least one SRS resource set according to the MAC CE;
   wherein the MAC CE comprises the at least one SRS resource set field and the at least one pathloss RS field;
   wherein: the at least one SRS resource set field has a one-to-one correspondence with the at least one pathloss RS field, one SRS resource set field in the at least one SRS resource set field is used to indicate an identity of one SRS resource set in the at least one SRS resource set, and one pathloss RS field in the at least one pathloss RS field is used to indicate an identity of one pathloss RS in the at least one pathloss RS;
   wherein the method further comprises: determining, by the terminal device, a size of each SRS resource set field in the at least one SRS resource set field according to a maximum number of the at least one SRS resource set;
   wherein in response to that the maximum number of the at least one SRS resource set is 16, each SRS resource set field occupies 4 bits.

2. The method according to claim 1, further comprising:
   determining, by the terminal device, a size of each pathloss RS field in the at least one pathloss RS field according to the number of the at least one pathloss RS.

3. The method according to claim 1, wherein the MAC CE further comprises a serving cell identity field, and the serving cell identity field is used to indicate an identity of a serving cell which the terminal device camps on.

4. The method according to claim 1, wherein the MAC CE further comprises a bandwidth part identity field, and the bandwidth part identity field is used to indicate an identity of a bandwidth part corresponding to the terminal device.

5. The method according to claim 1, wherein a header of a MAC protocol data unit where the MAC CE is located comprises a logical channel identifier field, and the logical channel identifier field is used to indicate a type of the MAC CE.

6. A method for activating or updating a pathloss reference signal corresponding to a sounding reference signal, the method comprising:
   sending, by a network device, a Medium Access Control (MAC) Control Element (CE) to a terminal device, wherein the MAC CE comprises at least one Sounding Reference Signal (SRS) resource set field and/or at least one pathloss Reference Signal (RS) field, the at least one SRS resource set field is used to indicate at least one SRS resource set, the at least one pathloss RS field is used to indicate at least one pathloss RS corresponding to the at least one SRS resource set, and the MAC CE is used to indicate the terminal device to update or activate the at least one pathloss RS corresponding to the at least one SRS resource set;
   wherein the MAC CE comprises the at least one SRS resource set field and the at least one pathloss RS field;
   wherein: the at least one SRS resource set field has a one-to-one correspondence with the at least one pathloss RS field, one SRS resource set field in the at least one SRS resource set field is used to indicate an identity of one SRS resource set in the at least one SRS resource set, and one pathloss RS field in the at least one pathloss RS field is used to indicate an identity of one pathloss RS in the at least one pathloss RS;

wherein the method further comprises: determining, by the network device, a size of each SRS resource set field in the at least one SRS resource set field according to a maximum number of the at least one SRS resource set;

wherein in response to that the maximum number of the at least one SRS resource set is 16, each SRS resource set field occupies 4 bits.

7. A terminal device, comprising one or more processors, memory storing a plurality of programs that, when executed by the one or more processors, cause the terminal device to:

receive a Medium Access Control (MAC) Control Element (CE) sent by a network device, wherein the MAC CE comprises at least one Sounding Reference Signal (SRS) resource set field and/or at least one pathloss Reference Signal (RS) field, the at least one SRS resource set field is used to indicate at least one SRS resource set, and the at least one pathloss RS field is used to indicate at least one pathloss RS corresponding to the at least one SRS resource set; and update or activate the at least one pathloss RS corresponding to the at least one SRS resource set according to the MAC CE;

wherein the MAC CE comprises the at least one SRS resource set field and the at least one pathloss RS field;

wherein: the at least one SRS resource set field has a one-to-one correspondence with the at least one pathloss RS field, one SRS resource set field in the at least one SRS resource set field is used to indicate an identity of one SRS resource set in the at least one SRS resource set, and one pathloss RS field in the at least one pathloss RS field is used to indicate an identity of one pathloss RS in the at least one pathloss RS;

wherein the method further comprises: determining, by the terminal device, a size of each SRS resource set field in the at least one SRS resource set field according to a maximum number of the at least one SRS resource set;

wherein in response to that the maximum number of the at least one SRS resource set is 16, each SRS resource set field occupies 4 bits.

8. The terminal device according to claim 7, wherein when the plurality of programs are executed by the one or more processors, the terminal device is caused to:

determine a size of each pathloss RS field in the at least one pathloss RS field according to the number of the at least one pathloss RS [field].

9. The terminal device according to claim 7, wherein the MAC CE further comprises a serving cell identity field, and the serving cell identity field is used to indicate an identity of a serving cell which the terminal device camps on.

10. The terminal device according to claim 7, wherein the MAC CE further comprises a bandwidth part identity field, and the bandwidth part identity field is used to indicate an identity of a bandwidth part corresponding to the terminal device.

11. The terminal device according to claim 7, wherein a header of a MAC protocol data unit where the MAC CE is located comprises a logical channel identifier field, and the logical channel identifier field is used to indicate a type of the MAC CE.

* * * * *